United States Patent [19]

Levin

[11] Patent Number: 4,734,017
[45] Date of Patent: Mar. 29, 1988

[54] AIR BLOWER

[76] Inventor: Mark R. Levin, 10032 Beacon Pond La., Burke, Va. 22015

[21] Appl. No.: 894,053

[22] Filed: Aug. 7, 1986

[51] Int. Cl.⁴ ........................ F04B 17/00; F04B 35/04
[52] U.S. Cl. .................................... 417/366; 417/411; 417/423 R; 415/208
[58] Field of Search ............... 417/411, 423 R, 423 T, 417/423 A, 366, 326; 415/210, 208; 362/183; 34/96

[56] References Cited

U.S. PATENT DOCUMENTS

| | | | |
|---|---|---|---|
| 2,441,239 | 5/1948 | Flanders | 415/210 |
| 2,668,686 | 2/1954 | Thomas | 415/210 |
| 3,099,386 | 7/1963 | Pieper | 417/411 |
| 3,407,431 | 10/1968 | Melnik | |
| 3,439,204 | 4/1969 | Ponczek et al. | 417/411 |
| 3,558,243 | 1/1971 | Trapp | 417/411 |
| 3,647,323 | 3/1972 | Thomas | 417/411 |
| 3,999,243 | 12/1976 | LaPour | |
| 4,044,750 | 8/1977 | Zeigler | 417/411 |
| 4,219,325 | 8/1980 | Gutzwiller | 415/210 |
| 4,388,673 | 6/1983 | Maglica | 362/183 |
| 4,516,561 | 5/1985 | Stawski et al. | 417/411 |
| 4,542,557 | 9/1985 | Levine | |
| 4,573,234 | 3/1986 | Kochte et al. | |

FOREIGN PATENT DOCUMENTS 77198  5/1983  Japan ........................... 415/208

Primary Examiner—Carlton R. Croyle
Assistant Examiner—Donald E. Stout
Attorney, Agent, or Firm—Finnegan, Henderson, Farabow, Garrett & Dunner

[57] ABSTRACT

A hand-held blower includes a tubular housing having a cavity, an open end and peripheral air inlets spaced from the open end. A dividing wall in the housing cavity separates the cavity into a forward and a rear compartment, the forward compartment having a motor and a fan mounted on the motor, and the rear compartment having a rechargeable power supply electrically connected to the motor. Actuating means electrically connects and disconnects the rechargeable power supply and the motor and a charging jack electrically connected to the rechargeable power supply is provided for connecting the power supply to an external power source.

14 Claims, 8 Drawing Figures

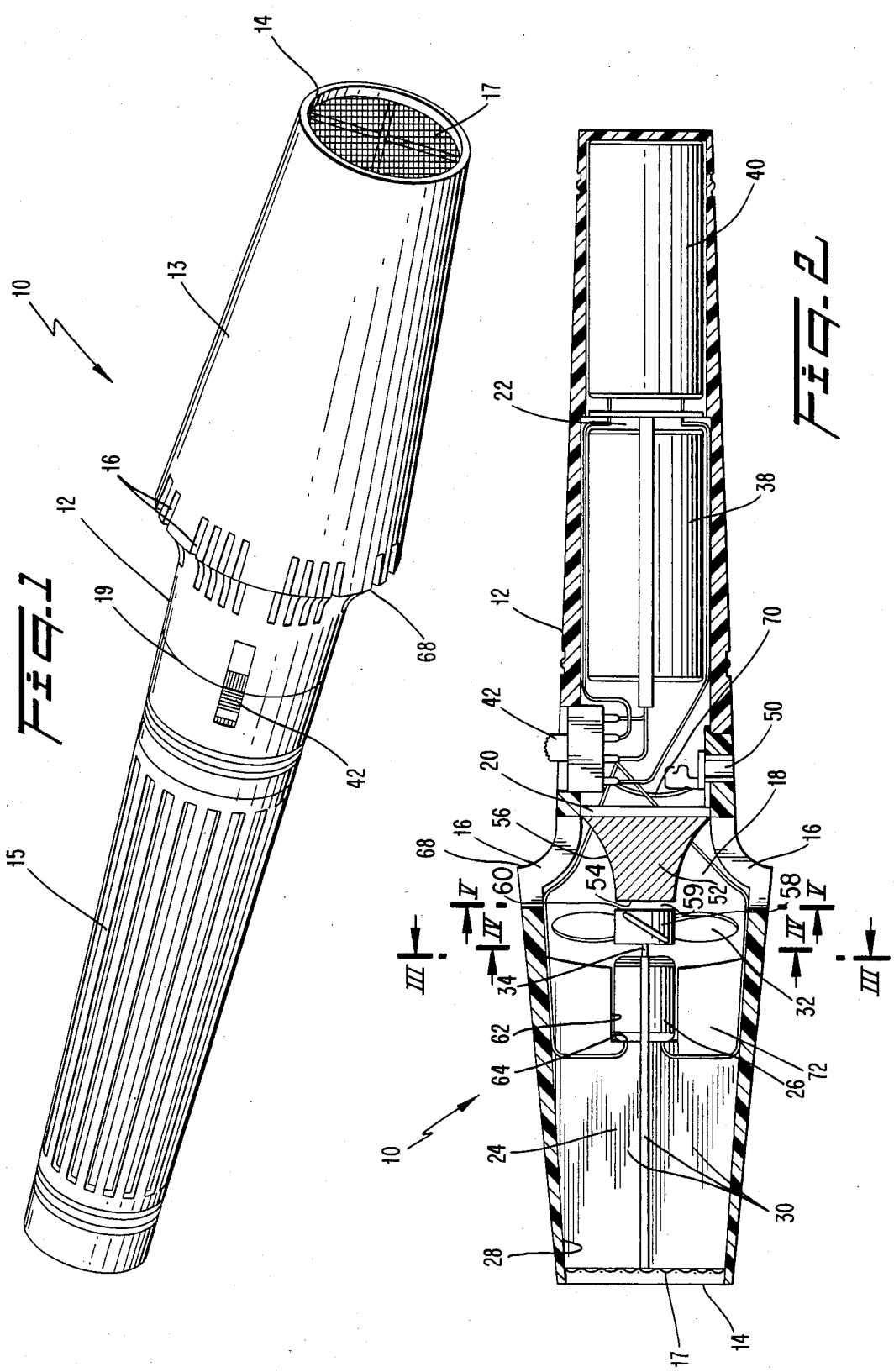

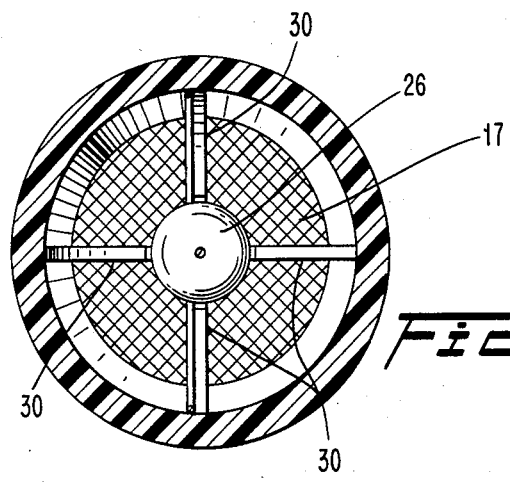
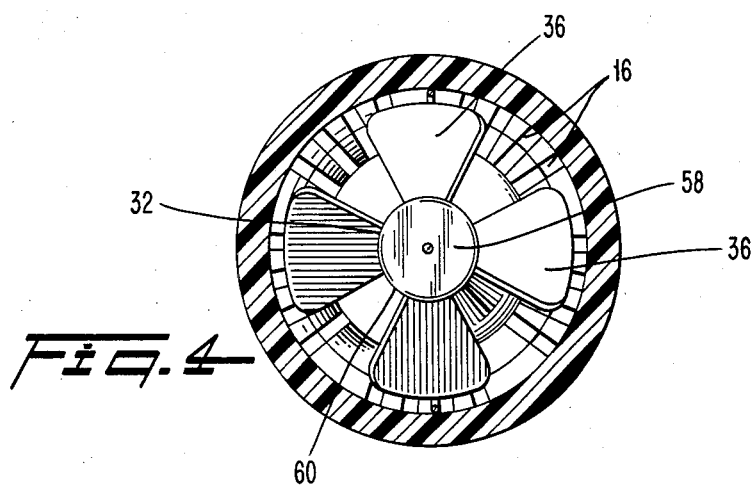
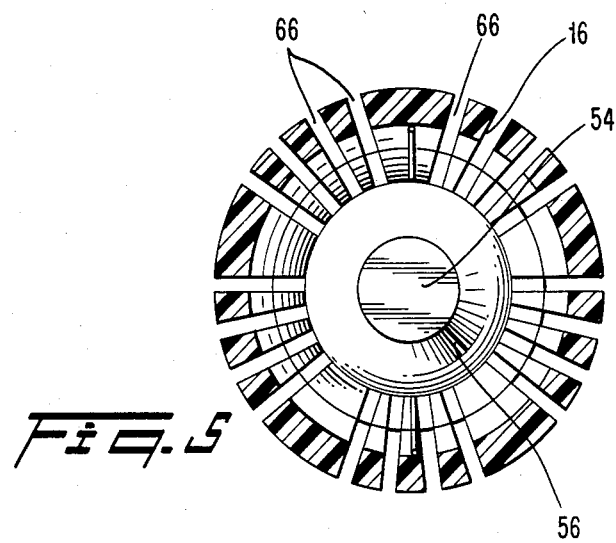

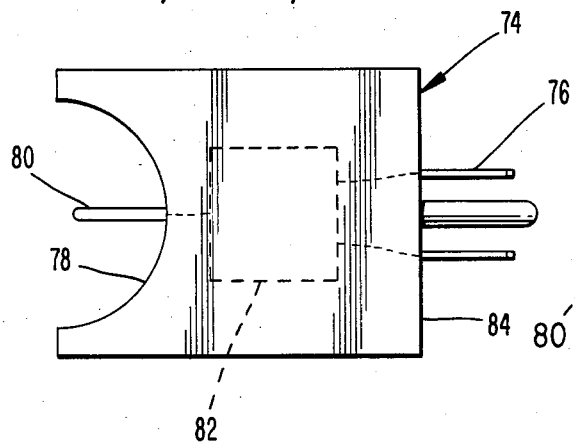
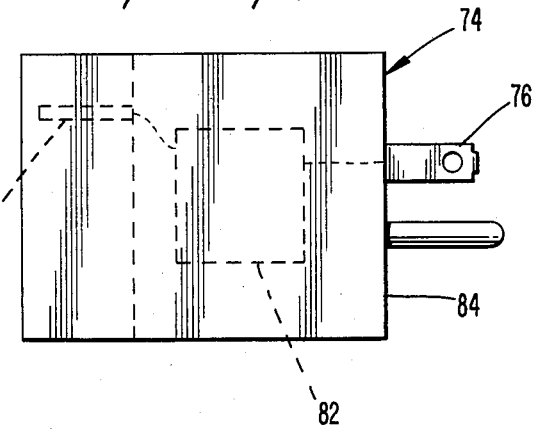
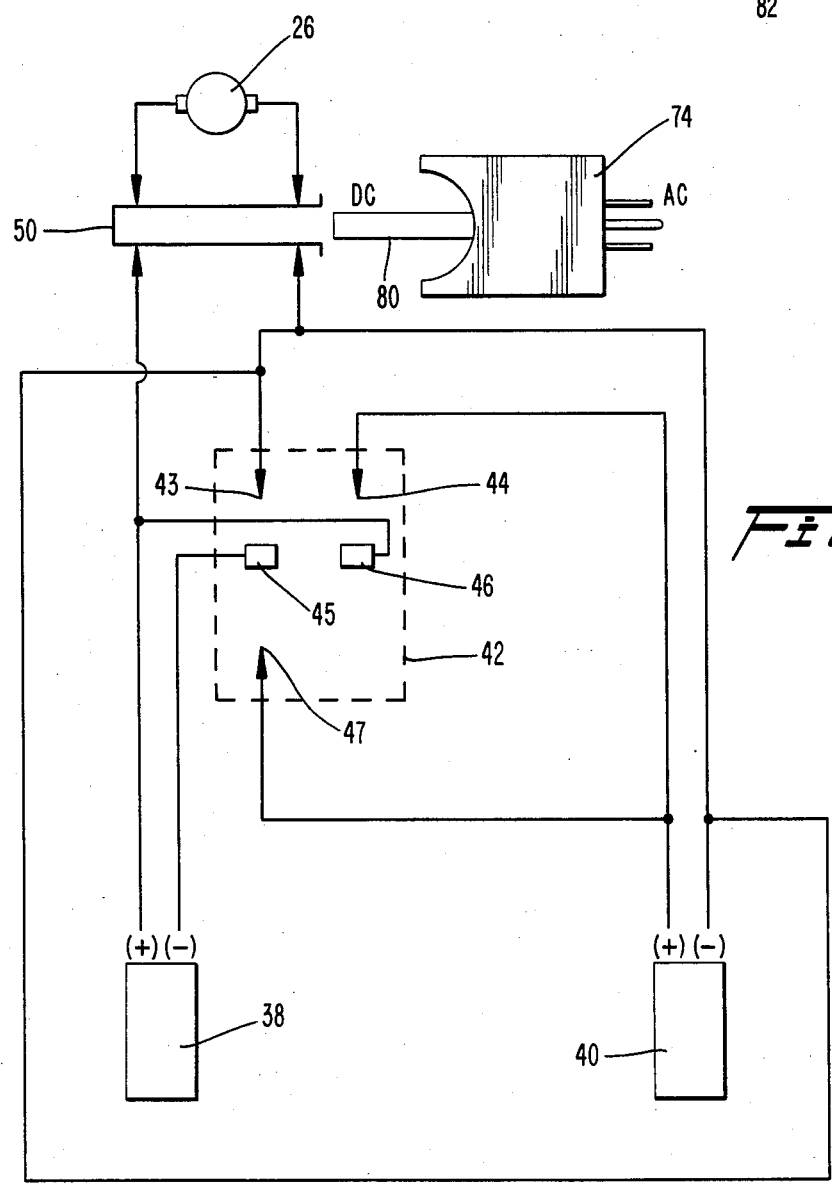

AIR BLOWER

BACKGROUND OF THE INVENTION

The present invention relates to air blowers; and more particularly to a hand-held air blower with a rechargeable power supply.

Air blowers are useful in numerous situations such as for drying a surface before applying a paint or adhesive, for cleaning an object, fanning the body, for drying hair, or for supplying air to a fire in a charcoal grill or a fireplace. For such applications, a light, porable and self powered hand-held blower is extremely useful. A blower that can operate independent of the availability of an electric power supply will be useful in a greater variety of siutations than a blower which is constrained by the availability of electric outlets. Providing a blower with a rechargeable power supply makes such operation possible. However, if the rechargeable power supply is unduly large, the air blower becomes unwieldy and the benefits of its being portable are lost.

In order for an air blower to be useful as a portable tool, it is important that the blower provide an air stream that can impact a surface one to three feet from the outlet of the blower. Further, it is preferred that the blower be capable of providing such an air stream over an extended period without frequent recharging. If such a blower can operate in excess of four hours on a single charge, the blower will be more useful to its operator. To achieve such an air stream over an extended period with a compact hand-held blower, it is important that blower turbulence be minimized. By decreasing air turbulence in the blower, a powerful air stream can be provided for an extended period without requiring the use of an excessively large or heavy rechargeable power supply.

It is also desirable that the rechargeable blower has a charging unit that is light and compact so that it can be easily carried in, for instance, a tool box, glove compartment or purse. Such a compact charger is convenient to transport and use. However, the charging unit should provide a support base on which the blower can be stored when not is use so that the blower will be available for use at any time without having to be precharged. Such a charging unit would preferably hold the air blower firmly in a position that electrically couples the blower with the charging base.

Thus, there exists a need to provide a light and compact blower having a rechargeable power supply that can operate the blower for a considerable length of time and that can be held and recharged by a charging base that is also compact and easily portable.

SUMMARY OF THE INVENTION

Accordingly, it is an object of the invention to provide a blower that is light and compact so that it can be easily held and directed by a hand of a person operating the blower.

It is another object of the invention to provide a hand-held blower with its own rechargeable power supply that can operate for a considerable period of time between charges.

It is another object of the invention to provide a hand-held blower that can blow a stream of air from a housing in which the stream of air experiences a minimum of air turbulence as it passes through the housing so as to minimize the power supply requirements.

A further boject of the invention is to provide a compact charging base for a rechargeable blower that is easily portable, can be plugged into any wall socket, and to which the power supply can be electrically coupled for recharging and storage.

Additional objects and advantages of the present invention will be set forth in a description that follows and in part will be obvious from the description or may be learned by practice of the invention. The objects and advantages of the invention may be realized and obtained by the apparatus particularly pointed out in the appended claims.

To achieve the foregoing objects, and in accordance with the purposes of the invention as embodied and as broadly described herein, a hand-held air blower comprises: a tubular housing having a cavity, an open end and peripheral air inlets spaced from the open end; a dividing wall in the housing cavity, the wall dividing the cavity into a rear closed compartment and a forward open compartment, the forward compartment including the open end and the peripheral air inlets; a motor mounted in the forward compartment; a fan mounted on the motor, the fan driven for rotation by the motor about the axis of the tubular housing, the fan mounted for drawing air into the forward compartment through the peripheral air inlets and for blowing air out through the open end of the housing; a rechargeable power supply in the rear compartment, the power supply electrically connected to the motor; actuating emans for electrically connecting and disconnecting the rechargeable power supply and the motor; and a charging jack electrically connected to the rechargeable power supply for connecting the rechargeable power supply to an external power source. The tubular housing includes interior walls in the forward compartment that are tapered toward the open end for concentrating air blown by the fan. The dividing wall has a substantially frustoconical face directed toward the forward compartment, the face including a central disc-shaped surface perpendicular to the axis of the housing and a concave peripheral surface surrounding the disc-shaped surface, the concave peripheral surface being aligned with the peripheral air inlets for guiding air from the peripheral air inlets to the fan. The fan includes a central hub coaxial with the axis of the tubular housing and a plurality of blades radially extending from the peripheral edge of the hub, the diameter of the hub being substantially equal to the diameter of the motor and to the diameter of the disc-shaped surface on the dividing wall. The substantially equal diameters of the fan hub, the motor and the disc-shaped surface are aligned for reducing air turbulence.

The accompanying drawings, which are incorporated in and constitute a part of this specification, illustrate a presently preferred embodiment of the invention and, together with the description, serve to explain the principles of the invention.

BRIEF DESCRIPTION OF THE DRAWINGS

FIG. 1 is a perspective view of a hand-held blower according to the present invention.

FIG. 2 is a lengthwise cross-sectional view of the blower shown in FIG. 1.

FIG. 3 is a cross-sectional view taken along the line III—III of FIG. 2.

FIG. 4 is a cross-sectional view taken along the line IV—IV of FIG. 2.

FIG. 5 is a cross-sectional view taken along the line V—V of FIG. 2.

FIG. 6 is a top view of the charging base for the blower shown in FIG. 1.

FIG. 7 is a side view of the charging base shown in FIG. 6.

FIG. 8 is an electric circuit diagram for the blower shown in FIG. 1.

DESCRIPTION OF THE PREFERRED EMBODIMENT

Reference will now be made in detail to a presently preferred embodiment of the invention, an example of which is illustrated in the accompanying drawings. Throughout the drawings, like reference characters are used to designate like elements. A hand-held blower is illustrated in FIGS. 1-5.

According to the present invention, a tubular housing having a cavity, an open end and peripheral air inlets spaced from the open end is provided. As embodied herein, and as shown in Figs. 1 and 2, a blower 10 includes a tubular housing 12 having an open end 14 and peripheral air inlets 16. Preferably, tubular housing 12 is comprised of a light and stiff moldable material, as for example, plastic. Tubular housing 12 is broken into a forward section 13 and a rear section 15 along a plane shown as a line 19. A hollow cavity 18 is formed within the housing. A screen 17 fits over open end 14 to keep debris from entering the housing.

According to the present invention, a dividing wall in the housing cavity is provided. The wall divides the cavity into a rear closed compartment and a forward open compartment, the forward compartment including the open end and the peripheral air inlets. As embodied herein, and as shown in FIG. 2, dividing wall 20 divides hollow cavity 18 into a rear closed compartment 22 and a forward open compartment 24. Forward compartment 24 is open to the outside through the open end 14 and peripheral air inlets 16.

According to the present invention, there is provided a motor mounted in the forward compartment. As embodied herein, and as best shown in FIGS. 2 and 3, a motor 26 is mounted in forward compartment 24. Motor 26 is attached to interior wall 28 of forward compartment 24 by vanes 30 which are fixed to the interior wall. Preferably, motor 26 is a 2.5 volt direct current electric motor.

According to the present invention, a fan mounted on the motor is provided. The fan is driven for rotation by the motor about the axis of the tubular housing, and the fan is mounted for drawing air into the forward compartment through the peripheral air inlets and for blowing air out through the open end of the housing. As embodied herein, and as best shown in FIGS. 2 and 4, a fan 32 is mounted on a shaft 34 of motor 26 so that fan 32 is driven for rotation by motor 26 about the axis of tubular housing 12. Fan 32 includes a plurality of blades 36 which when rotated by motor 26 draw air into the forward compartment through peripheral air inlets 16 and blow air out through the open end of the tubular housing. Fan 32 may, for example, have 8 blades and be comprised of plastic.

According to the present invention, the motor is positioned between the fan and the open end of the tubular member and a space is provided between the motor and the interior walls of the housing through which air blown by the fan passes for cooling the motor. As embodied herein, motor 26 is mounted upstream of fan 32 and a peripheral space 72 is provided around the motor.

According to the present invention, a rechargeable power supply in the rear compartment is provided. The power supply is electrically connected to the motor. As embodied herein, rechargeable power supply batteries 38, 40 are provided in rear compartment 22 of tubular housing 12. Rechargeable batteries 38, 40 are electrically connected to motor 26 through a switch 42. In one particular application, motor 26 was ablve to drive fan 32 for a period of approximately four hours at a high speed, utilizing stored power from rechargeable batteries 38, 40. Preferably, the batteries are conventional D-cell rechargeable batteries.

According to the present invention, actuating means for electrically connecting and disconnecting a rechargeable power supply and the motor is provided. As embodied herein, switch 42, which electrically connects the batteries to the motor, is preferably a three position double pole double throw switch. Switch 42 has an off position, which electrically disconnects batteries 38, 40 from motor 26, a first position, which connects the batteries in series to motor 26 to provide motor 26 with approximately 3 volts so as to drive the motor and fan at a high speed, and a second position which connects the batteries in parallel to motor 26 to provide 1.5 volts to the motor so as to drive the fan at a low speed.

According to the present invention, a charging jack is provided that is electrically connected to the rechargeable power supply for connecting the rechargeable power supply to an external power source. As embodied herein, a charging jack 50 is mounted in the side of tubular housing 12 and is electrically connected to rechargeable batteries 38, 40. Batteries 38, 40 are electrically recharged when a power source is inserted into charging jack 50.

According to the present invention, the charging jack is fixed near the end of the second compartment abutting the dividing wall to extend perpendicular to the axis of the tubular housing and to open to an outer surface of the tubular housing. As embodied herein, charging jack 50 is fixed in the tubular housing 12 and opens to an outer surface of the tubular housing. The outer surface of the charging jack is flush with the outer surface of the tublar housing. Charging jack 50 is connected to rechargeable batteries 38, 40 via electrical connector wires 70. Charging jack 50 is a closed circuit type jack and it is in electrical connection between motor 26 and the remainder of the blower electric circuit, as shown in FIG. 8. When blower 10 is not held on charging base 74, electric contacts in charging jack 50 are closed to connect motor 26 to batteries 38, 40 through switch 42. Inserting a power supply prong 80 on a charging base 74 into charging jack 50 disconnects the electric contacts in charging jack 50 to disconnect motor 26 from the rest of the electric circuit shown in FIG. 8 and to connect DC power from prong 80 to the circuit. When air blower 10 is again removed from base 74 and prong 80 is withdrawn from charging jack 50, motor 26 and batteries 38, 40 are again electrically connected.

The electric contacts of switch 42 are shown in the circuit diagram of FIG. 8. Switch 42 includes front contacts 43 and 44, movable contacts 45 and 46, and back contact 47. When switch 42 is in the off position, movable contacts 45 and 46 are in the intermediate position shown in FIG. 8. In such position, batteries 38, 40 are disconnected from motor 26. When switch 42 is moved to the first position, movable contacts 45 and 46 are moved to electrically contact front contacts 43 and 44, respectively, so as to connect batteries 38, 40 in parallel with motor 26. When switch 42 is moved to the second position, movable contacts 45 and 46 are moved so that movable contact 45 contacts back contact 47 so as to connect batteries 38, 40 in series with motor 26. Switch 42 should preferably be placed in the second position during charging of batteries 38, 40, but may also be placed in the first position for charging.

According to the present invention, the tubular housing interior walls in the forward compartment are tapered toward the open end for concentrating air blown by the fan. As embodied herein, interior wall 28 tapers toward open end 14 so that the stream of air blown by fan 32 is concentrated as it approaches the open end of the tubular housing.

According to the present invention, the dividing wall has a substantially frustoconical face directed toward the forward compartment. The face includes a central disc-shaped surface perpendicular to the axis of the housing and a concave peripheral surface surrounding the disc-shaped surface, the concave peripheral surface being aligned with the peripheral air inlets for guiding air from the peripheral air inlets to the fan. As embodied herein, and as shown in FIGS. 2 and 5, dividing wall 20 includes a substantially frustoconical face 52 having a disc-shaped surface 54 perpendicular to the axis of tubular housing 12 and a concave peripheral surface 56 surrounding the disc-shaped surface 54. Concave peripheral surface 56 is aligned with peripheral air inlets 16 so as to guide air entering forward compartment 24 to the blades of fan. Dividing wall 20 is preferably comprised of a light and stiff moldable material as, for example, plastic.

According to the present invention, the fan includes a central hub coaxial with the axis of the tubular housing and a plurality of blades radially extending from a peripheral edge of the hub. The diameter of the hub is substantially equal to the diameter of the motor, and the diameter of the disc-shaped surface on the dividing wall is substantially equal to the diameters of the hub and the motor, the substantially equal diameters being aligned for reducing air turbulence. As shown in FIG. 4, fan 32 has a hub 58 that is coaxial with the axis of the tubular member 12. Motor shaft 34 is connected to the central axis of the hub. A plurality of fan blades 36 extend radially from peripheral edge 60 of hub 58. The diameter of hub 58 is substantially equal to the diameter of motor 26 and the diameter of disc-shaped surface 54 on dividing wall 20. The substantially equal diameters are aligned so that air drawn through peripheral air inlets 16 and guided by concave peripheral surface 56 of dividing wall 20 is driven by the fan blades past the motor with minimal air turbulence.

According to the present invention, the fan hub is aligned with the disc-shaped surface of the dividing wall with a minimal clearance there between so as to reduce air turbulence. As embodied herein, and as shown in FIG. 2, a small clearance 59 exists between peripheral edge 60 of hub 58 and disc-shaped surface 54 so as to minimize air turbulence in the passing air stream.

According to the present invention, a plurality of air vanes aligned with the axis of the tubular housing and extending radially inward from the interior walls of the tubular housing are provided for reducing air turbulence. As embodied herein, air vanes 30 are fixed to interior wall 28 of forward compartment 24 of tubular housing 12. Vanes 30 comprise thin planar surfaces of a light and stiff material as, for example, a hard plastic. Preferably, four equidistantly spaced vanes 30 each have a cutout portion 62. Cutout portions 62 of each of the vanes together form a motor mounting slot 64 in which motor 26 is attached. The motor is preferably fixed in the motor mounting slot by an adhesive, such as a quick bonding glue. Vanes 30 may be formed as a unit and inserted into the forward compartment 24; or such vanes 30 may be formed integrally with the interior wall of the tubular housing.

According to the present invention, the plurality of air inlets includes a plurality of axially aligned slots spaced about the periphery of the tubular housing and aligned to extend the axial length of the frustoconical dividing wall. A portion of the tubular housing adjacent the concave surface of the dividing wall having the axially alinged slots flares peripherally outward to increase the diameter of the housing in the direction of the open end so that air passes through the slots at an angle corresponding to the angle of the concave peripheral surface of the dividing wall. As embodied herein, a plurality of axially aligned slots 66 are spaced about the periphery of tubular housing 12 and are aligned to extend the axial length of frustoconically shaped face 52 of dividing wall 20. An outwardly flared portion 68 of tubular housing 12 increases in diameter toward the open end of the housing. The angle of slots 66 in the peripherally flared portion 68 of tubular housing 12 are at an angle such that air passing through slots 66 passes at an angle that is aligned with concave peripheral surface 56 of dividing wall 20.

According to the present invention, a charging base formed for holding the tubular housing during charging is provided. As shown in FIGS. 6 and 7, the charging base 74 is provided with a pair of conductive prongs 76 for inserting into an electric wall outlet (not shown). The charging base includes a semicircular concave molded outer surface 78 that complements the exterior surface of the tubular housing.

According to the present invention, there is provided means electrically connected to the conductive prongs for transforming electric current from the wall outlet into a current suitable for recharging the rechargeable power supply and a power supply prong for electrically connecting the output of said transforming means to said rechargeable power supply. As embodied herein, power supply prong 80 is mounted on semicircular concave outer surface 78 of charging base 74. A conventional electric transformer 82 having a rectifier in the recharging base alters AC input current from the conductive prongs to low voltage DC output current for power supply prong 80 that is suitable for recharging rechargeable batteries 38, 40. Charging jack 50 on the tubular housing 12 couples with the power supply prong 80 when the tubular housing is held on the charging base for storage and recharging. Semicircular concave surface 78 firmly fits against the outer surface of the tubular housing 12 when the charging jack and power supply prong are coupled.

According to the present invention, the charging base has a minimum thickness great enough so that when the charging base is plugged into a wall socket and the blower is electrically coupled to the charging base, the outer surface of the blower is spaced from the wall. As embodied herein, the charging base has a thickness great enough, from the wall abutting side 84 to the closest point on semicircular concave surface 78, that charging base 74, when plugged into an electric wall socket, can support the tubular housing in a position spaced from the wall on which the wall socket is located.

In view of the foregoing, the present invention may be summarized as a hand-held blower and recharging base including a tubular housing holding a motor driven fan and a rechargeable power supply for driving the motor. Peripheral inlet vents in the tubular housing, a dividing wall in the housing, the fan hub, the motor and the interior walls of the housing are formed to provide a stream of air out the open end of the housing with relatively little air turbulence. The turbulence reducing arrangement of the present invention allows the power supply to drive the motor for a longer period of time than would be possible without this arrangement. The hand-held blower of the present invention is highly portable and can be utilized for an extended period without being directly connected to a power supply.

It will be apparent to those skilled in the art that modifications and variations can be made in the hand-held blower of this invention. The invention in its broader aspects is therefore, not limited to the specific details, representative apparatus, and illustrative examples shown and described above. Thus, it is intended that all matter contained in the foregoing description or shown in the accompanying drawings shall be interpreted as illustrative and not in a limiting sense.

What is claimed is:

1. A hand-held air blower, comprising:
    a tubular housing having a cavity, an open end and peripheral air inlets spaced from said open end;
    dividing wall in said housing cavity, said wall dividing said cavity into a rear closed compartment and a forward open compartment, said forward compartment including said open end and said peripheral air inlets;
    a motor mounted in said forward compartment;
    a fan mounted on said motor, said fan driven for rotation by said motor about the axis of said tubular housing, said fan mounted for drawing air into said forward compartment through said peripheral air inlets and for blowing the air out through said open end of said housing;
    a power supply in said rear compartment, said power supply electrically connected to said motor;
    wherein said dividing wall has a substantially frustoconical face directed toward said forward compartment, said face including a central disc-shaped surface perpendicular to the axis of said housing and a concave peripheral surface surrounding said disc-shaped surface, said concave peripheral surface aligned with said peripheral air inlets for guiding air from said peripheral air inlets to said fan.

2. The blower of claim 1, wherein said tubular housing includes interior walls in said forward compartment that are tapered toward said open end for concentrating air blown by said fan.

3. The blower of claim 1, wherein said fan includes a central hub coaxial with the axis of said tubular member and a plurality of blades radially extending from a peripheral edge of said hub, the diameter of said hub being substantially equal to the diameter of said motor, and wherein the diameter of said disc-shaped surface on said dividing wall is substantially equal to the diameters of said hub and said motor, said substantially equal diameters being aligned for reducing air turbulence.

4. The blower of claim 3 further comprising a plurality of air vanes aligned with the axis of said tubular housing and extending radially inward from the interior walls of said tubular housing, said air vanes being for reducing air turbulence.

5. The blower of claim 3, wherein said air inlets include a axially aligned slots spaced about the periphery of the tubular housing and aligned to extend the axial length of said frustoconical face of said dividing wall, and wherein a portion of the tubular housing adjacent said concave surface of said dividing wall having said slots flares peripherally outward to increase the diameter of said housing in the direction of said open end so that air passes through said slots at an angle corresponding to the angle of the concave peripheral surface of said dividing wall.

6. The blower of claim 5 wherein said fan hub is aligned with said disc-shaped surface of said dividing wall with a minimal clearance there between so as to reduce air turbulence.

7. A blower of claim 1, wherein said power supply is a rechargeable power supply, and wherein said blower further comprises actuating means for electrically connecting and disconnecting said rechargeable power supply and said motor, and a charging jack electrically connected to said rechargeable power supply for connecting said rechargeable power supply to an external power source.

8. The blower of claim 7 wherein said charging jack is fixed near the end of said second compartment abutting said dividing wall to extend perpendicular to the axis of said tubular housing and to open to an outer surface of said tubular housing.

9. The blower of claim 1 wherein said motor is positioned betwen said fan and said open end and a space is provided between said motor and the interior walls of said housing through which air blown by said fan passes for cooling said motor.

10. The blower of claim 9, further comprising a plurality of air vanes in said forward compartment, said air vanes aligned with the axis of said tubular housing and extending radially inward from the interior walls of said tubular housing, said motor being mounted on said air vanes, such that said air vanes support said motor and reduce air turbulence.

11. The blower of claim 7, wherein said rechargeable power supply includes two rechargeable batteries, and wherein said actuating means can electrically connect said batteries in series to drive said motor and fan at a high speed, and in parallel to drive said motor and fan at a low speed.

12. A hand-held air blower, comprising:
    a tubular housing having a cavity, an open end and peripheral air inlets spaced from said open end;
    a dividing wall in said housing cavity, said wall dividing said cavity into a rear closed compartment and a forward open compartment, said forward compartment including said open end and said peripheral air inlets, said dividing wall having a substantially frustoconical face directed toward said forward compartment, said face including a central disc-shaped surface perpendicular to the axis of said housing and a concave peripheral surface surrounding said disc-shaped surface, said concave peripheral surface aligned with said peripheral air inlets for guiding air from said peripheral air inlets to said open end;
    a motor in said forward compartment;

a fan on said motor, said fan driven for rotation by said motor about the axis of said tubular housing, said fan mounted for drawing air into said forward compartment through said peripheral air inlets and for blowing air out through the open end of said housing;

a rechargeable power supply in said rear compartment, said power supply electrically connected to said motor;

actuating means for electrically connecting and disconnecting said rechargeable power supply and said motor;

a charging base formed for holding said tubular housing during charging, said charging base including a pair of conductive prongs for inserting into an electrical wall outlet, means electrically connected to said prongs for transforming electric current from the wall outlet into a current suitable for recharging said rechargeable power supply, and a power supply prong for electrically connecting said output of said transforming means to said rechargeable power supply; and a charging jack electrically connected to said rechargeable power supply, said charging jack for coupling with said power supply prong on said charging base when said tubular housing is held on said charging base for recharging said rechargeable power supply.

13. The blower of claim 12, wherein said charging base includes a semicircular modled surface that complements the exterior surface of said tubular housing, said power supply prong being provided on said complementary surface, said power supply prong and said complementary surface firmly holding said tubular housing when said charging jack and said power supply prong are coupled.

14. The blower of claim 13, wherein said charging base has a minimum thickness great enough so that when said charging base is plugged into a wall socket and the blower is coupled to the charging base, the outer surface of the blower is spaced from the wall.

* * * * *